(12) United States Patent
Kole

(10) Patent No.: US 7,012,236 B2
(45) Date of Patent: Mar. 14, 2006

(54) SENSOR IN A TRANSCEIVER DEVICE FOR COOPERATION WITH AN OPTICAL FIBER

(75) Inventor: Marcus Egbert Kole, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 125 days.

(21) Appl. No.: 10/276,988

(22) PCT Filed: Mar. 21, 2002

(86) PCT No.: PCT/IB02/00950

§ 371 (c)(1),
(2), (4) Date: Nov. 21, 2002

(87) PCT Pub. No.: WO02/077571

PCT Pub. Date: Oct. 3, 2002

(65) Prior Publication Data

US 2004/0099794 A1 May 27, 2004

(30) Foreign Application Priority Data

Mar. 26, 2001  (EP) .......................................... 01201115

(51) Int. Cl.
*G01J 1/42* (2006.01)

(52) U.S. Cl. .............................. 250/208.2; 250/227.11; 250/206.1; 385/12

(58) Field of Classification Search ......... 398/135–139; 356/614–616; 250/208.2, 559.29, 559.3, 250/206.1, 206.2; 385/12
See application file for complete search history.

(56) References Cited

U.S. PATENT DOCUMENTS

| | | | | |
|---|---|---|---|---|
| 4,515,479 A | * | 5/1985 | Pryor | 356/615 |
| 6,320,173 B1 | * | 11/2001 | Vock et al. | 250/206.1 |
| 6,492,636 B1 | * | 12/2002 | Chen et al. | 250/227.14 |

* cited by examiner

*Primary Examiner*—Stephone B. Allen
*Assistant Examiner*—Patrick J. Lee
(74) *Attorney, Agent, or Firm*—Adam L. Stroud

(57) ABSTRACT

A receiving device for cooperation with an optical fiber is provided with a sensor (3). The sensor (3) comprises two or more distinct sensor elements (4a, ..., 4d) delivering an output signal with a strength that depends on the intensity applied to the sensor element (4a, ..., 4d). A greatest dimension (a) of the sensor element (4a, ..., 4d) is at most equal to half the diameter of a diffraction-limited spot (5) of the beam (2) exiting the optic fiber (1) at the location of the sensor elements (4a, ..., 4d). A diametrical dimension (c) of the part of the sensor (3) provided with sensor elements (4a, ..., 4d) is greater than the diameter of the beam (2) exiting from the optical fiber (1). Means (15) are present for determining the strength of the output signal from each sensor element (4a, ..., 4d).

9 Claims, 2 Drawing Sheets

SENSOR IN A TRANSCEIVER DEVICE FOR COOPERATION WITH AN OPTICAL FIBER

Figure 1:
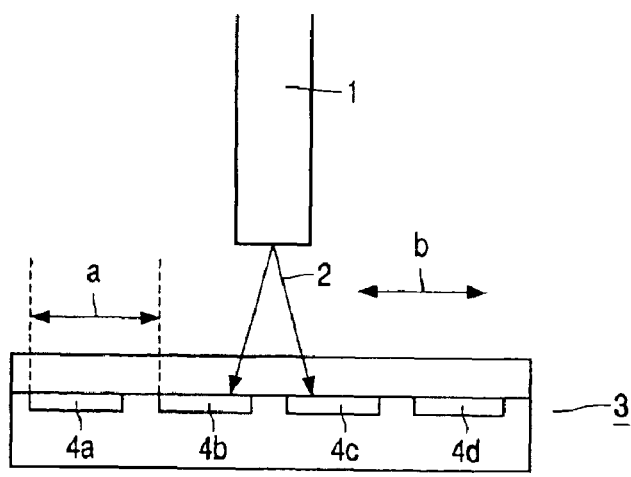

The invention relates to a sensor for a receiving device for cooperation with an optical fiber for converting a signal in the form of a beam exiting from the optical fiber into a different type of signal, comprising two or more mutually separated sensor elements, which sensor elements deliver an output signal with a strength which is dependent on the intensity applied to the sensor element.

Such a sensor is known from a Japanese open patent application JP-A-06/059167 laid open to public inspection. The sensor disclosed therein is used for aligning an optical axis of an optical fiber with an optical axis of other optical parts of a device, and consequently it is circularly symmetrical in shape with a central portion that is not sensitive to radiation.

Optical-optical communication systems require a precise alignment of one end of the optical fiber with the optical transmitters and receivers. Owing to the mechanical complexity of this process, the correct arrangement of the various parts with respect to each other is the main cost factor when connecting an optical fiber to an optical communication system. Even in low-cost applications for relatively small distances, in the range of 2 to 10 km, which use multimode fibers and synthetic optical fibers, the arrangement of the parts is still a major cost factor. The use of mechanical self-alignment techniques has already resulted in a reduction of the cost of these systems in comparison with the previously known methods, in which the alignment had to be carried out manually.

It is an object of the invention to provide a sensor by means of which the alignment can take place in an automatic and non-mechanical manner, so that said alignment can take place considerably faster and at lower cost.

Another object of the invention is to increase the mechanical sturdiness of such a transceiver device.

Various factors, such as vibrations, temperature differences and the like, cause constant mechanical shifting of an entry/exit surface of an optical fiber with respect to a transceiver device.

The object of the invention is to provide a dynamic alignment of the optical fiber with respect to the sensor.

According to the invention, this objective is achieved in that a greatest dimension of a sensor element is at most equal to half the diameter of a diffraction-limited spot of the beam exiting the optic fiber at the location of the sensor elements, in that a diametrical dimension of the portion of the sensor provided with sensor elements is greater than the diameter of the beam exiting from the optical fiber, and in that means are present for determining the strength of the output signal from each sensor element.

This renders it possible to use sensor elements having a very low capacitance, as a result of which the sensor will be capable of processing signals at a high frequency.

Another effect is that the exiting beam only irradiates a limited number of all possible sensor elements and that only those output signals of the irradiated sensor elements that are strongest will be used for further processing. Since the sensor elements extend over an area that is larger than the diameter of the exiting beam, mechanical shifting caused by vibrations and the like does not affect the signal delivered by the sensor.

A preferred embodiment of a device provided with such a sensor is characterized in that the device includes adjustable means for supplying output signals delivered by the sensor elements to a processing device, and control means for adjusting the supplying means so as to supply or not supply output signals from a sensor element to the processing device in dependence on the strength of the output signal from the sensor element, in that said supplying means can be set to supply output signals from more than one sensor element, and in that means are present for determining the signal supplied to the processing means on the basis of the majority of the output signals to be supplied.

As a result, only output signals from sensors that actually deliver an output signal are supplied, and a majority decision is taken as regards a value of the output signal as a whole that is delivered by the sensor to further processing apparatus.

Figure 2:
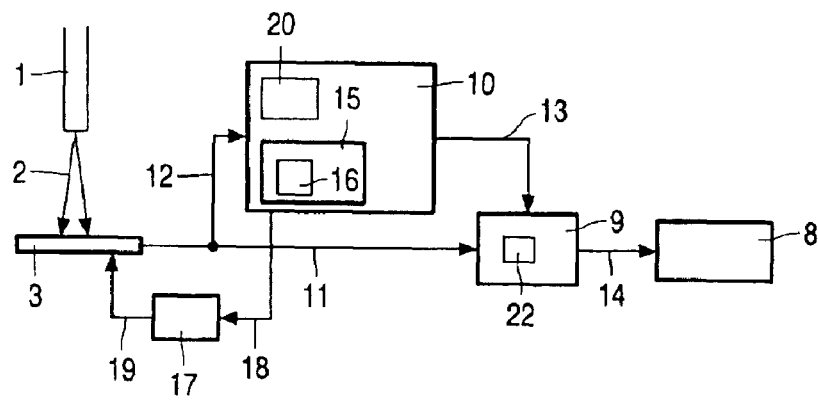
Figure 3:
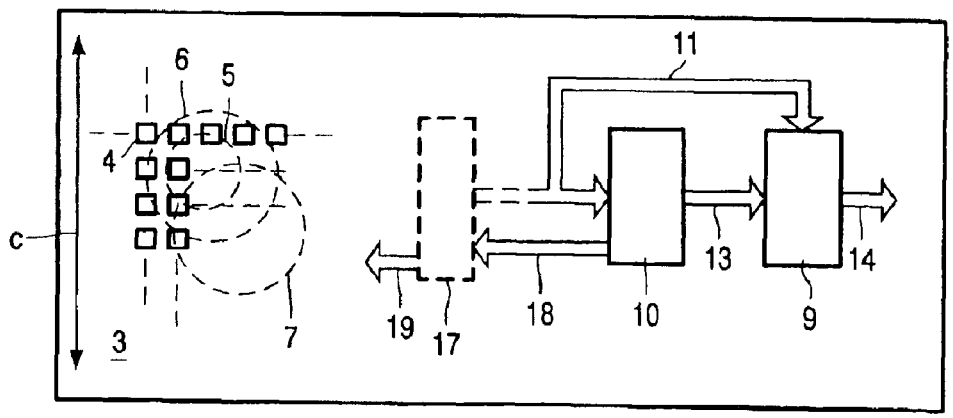
Figure 4:
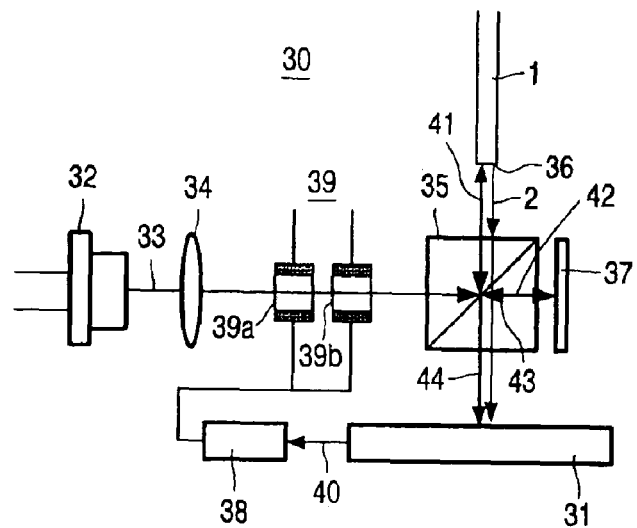
Figure 5:
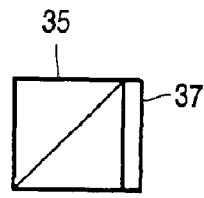
Figure 6:
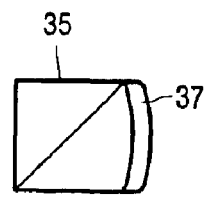
Figure 7:
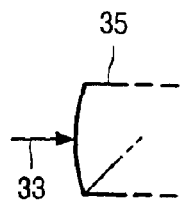

The invention will now be explained in more detail with reference to the appended drawings, in which:

FIG. 1 diagrammatically shows an optical fiber and a sensor;

FIG. 2 diagrammatically shows a circuit for supplying signals from a sensor to a processing circuit;

FIG. 3 diagrammatically shows an integrated circuit according to FIG. 2;

FIG. 4 diagrammatically shows a transceiver device for cooperation with an optical fiber;

FIGS. 5, 6 and 7 show various embodiments of a beam-splitting prism.

In FIG. 1, reference numeral 1 indicates an optical fiber, from which a radiation beam, diagrammatically indicated by reference numeral 2, can exit. The exiting beam 2 hits a sensor 3. The sensor 3 comprises sensor elements, which are diagrammatically indicated by the reference numerals 4a, 4b, 4c and 4d, which are sensitive to the radiation in the beam 2. In many cases, the sensor elements 4a . . . 4d will be photodiodes, which induce a potential difference across a capacitor element in response to incident radiation. The larger the surface area of the sensor element, the greater the associated capacitance. It is desirable to keep the associated capacitance as small as possible so as to be able to process signals in the shape of modulated beams 2 at a maximum modulation frequency. Prior art sensors try to find an equilibrium between the desire to use minimum dimensions for the sensors 4a, . . . , 4d, hereinafter also referred to as sensors 4, in connection with the capacitance associated therewith and on the other hand to design them to have maximum dimensions so as to enable an easy mechanical positioning of one end of the optical fiber 1 with respect to the sensor 3. The larger the sensor 3, the less stringent the requirements imposed on the mechanical precision with which the end of the optical fiber 1 is to be positioned with respect to the sensor 3.

The sensor 3 comprises a large number of sensitive sensor elements 4 (cf. FIG. 3). A diametrical dimension of a pixel corresponding to a sensor element 4a is indicated by arrow a. A beam 2 from an optical fiber 1 preferably has a diameter which is as small as possible both upon exiting the optical fiber 1 and upon hitting the sensor 3. Nevertheless, it is not possible for a spot having a diameter smaller than that determined by the numeric aperture of the optical fiber 1 and any optical elements (not shown) arranged between one end of the optical fiber 1 and the sensor 3 to form on the sensor 3, on account of the wave character of the beam which is transported through the optical fiber 1 and which exits said optical fiber 1 as the beam 2. The minimum spot size that can be achieved is the diffraction-limited spot size.

The diametrical dimension a of a pixel of the sensor 3 is less than half the diameter of a diffraction-limited spot of the beam 2 on the sensor 3. In this manner, a number of sensor elements 4 will be hit by the beam 2 at all times. A spot having a diffraction-limited diameter is diagrammatically indicated by reference numeral 5 in FIG. 3.

A major problem with regard to the precise alignment of an optical fiber 1 with respect to a sensor, such as the sensor 3, which converts the signal present in the beam 2 into another type of signal, such as an electrical signal or a magnetic signal or a temperature signal or the like, is the permanently precise alignment of the end of the optical fiber 1 with respect to the sensor 3. Said alignment is subject to mechanical jolts and vibrations. Such jolts and vibrations cause the beam 2 and the sensor 3 to move with respect to each other, as is diagrammatically indicated by the double arrow b. It has not been attempted within the framework of the present invention to prevent the occurrence of vibrations and jolts as much as possible, as in the prior art, but instead to design the sensor 3 such that movements of the beam 2 with respect to the sensor 3 will not have an adverse effect on the signals delivered by the sensor 3.

In FIG. 3, reference numerals 6 and 7 show in two positions the dimension of the beam 2 at the location of the sensor 3 by way of example. It stands to reason that a diametrical dimension of the beams 6 and 7 is at least as large as a corresponding diametrical dimension of the diffraction-limited spot 5.

FIG. 2 shows the manner in which output signals from the various sensor elements 4a . . . 4d are supplied to a processing circuit 8. The signals are supplied by supplying means 9. Said supplying means 9 are arranged for not supplying each and every output signal from each sensor element 4 of the sensor 3 to the processing device 8. In order to enable this, the supplying means 9 are adjustable. Furthermore, adjustment means 10 are shown which control the adjustment of the supplying means 9 in dependence on the output signals from the sensor elements 4 of the sensor 3. Output signals from the sensor elements 4 of the sensor 3 are supplied to an input of the supplying means 9 via a line 11. The same output signals are supplied to an input of the adjustment means 10 via a line 12. The adjustment means 10 are arranged for delivering, via a line 13 in a manner yet to be described, a signal which determines for each sensor element 4 whether the output signal from the sensor element in question that is present on the line 11 at that moment can or cannot be supplied to the processing device 8 via the line 11 by the supplying means 9.

The adjustment means 10 comprise means 15 for determining the strength of a signal which enters the adjustment means 10 via the line 12. To that end, said means 15 comprise, for example, a threshold circuit 16, for example. Depending on the strength of the output signal on the line 12, an output signal from the adjustment means 10 is present on the line 13, which adjustment means adjust the supplying means so as to relay that same output signal, which is present on the line 11 at an input of the supplying means 9, to the processing device 8 via a line 14.

A control device 17 which is known per se, see FIG. 3, arranges for the sensor elements 4 to be read. The speed at which said reading takes place is sufficiently high to enable precise following of the modulation in the beam 2.

Since the area covered with sensor elements 4 is larger than the diameter of the beam 2 as indicated by reference numerals 6 and 7 (see the diametrical dimension c), only those sensor elements 4 that are present within the areas encompassed by circles 6 and 7 will induce an output signal different from zero on the lines 11 and 12, respectively. All other sensor elements 4 will induce a zero signal and will not contribute to the signal on the line 14. It is not much use, therefore, to read the sensor elements 4 not hit by the beam 2 anew each time. The adjustment means 10 are connected to the control device 17 via a line 18. Via said line 18, the adjustment means 10 inform the control device 17 which sensor elements 4 induce a zero signal and consequently need not be included in the regular readout of the sensor elements 4. Only the sensor elements 4 that are hit by a beam 2 need to be read anew each time, and preferably also a circle of sensor elements surrounding said elements, so as to be able to follow the aforesaid shifts of the beam 2 with respect to the sensor 3.

The adjustment of the control device 17 as described above for reading only a limited number of the sensor elements 4 on the sensor 3 may take place every time the sensor elements 4 are read, but it may alternatively be done once from time to time, after which the adjustment of the control device 17 is not changed for a number of readouts. The readjustment of the control device 17 via the line 18 only needs to take place at such a renewal frequency that the control device will be able to follow the frequency of the shifts of the beam 2 with respect to the sensor 3 in accordance with the Nyquist criterion, i.e. the period between predetermined points in time at which the control device 17 is reset by the adjustment means is smaller than half the period of the highest frequency of a shift of the beam 2 with respect to the sensor 3. The adjustment means 10 may be provided with timer means 20 for that purpose.

FIG. 3 diagrammatically shows an integrated circuit 21 comprising the sensor 3 as well as the control device 17, the adjustment means 10, and the supplying means 9. The control device 17 and/or the adjustment means 10 and/or the supplying means 9 need not necessarily be arranged on the same integrated circuit as the sensor 3.

In the foregoing, the adjustment means 10 have been described as being arranged such that some output signals from the sensor elements 4 of the sensor 3 are and other signals are not converted into a signal on the line 13, as a result of which the supplying means 9 relay the output signal in question from the line 11 to the line 14. Alternatively, it is possible to supply only those output signals that are strongest from the line 11 to the line 14, in the case of electrical signals, for example, those signals that have the largest amplitude in current or in voltage or otherwise.

In the manner described above, the signal which is eventually put on the line 14 and which represents the modulated signal from the beam 2 at some point in time will be present independently of any movement of beam 2 with respect to the sensor 3. Furthermore, it can be arranged via the adjustment means 10 that only those output signals that are strongest will be supplied to the line 14.

The effect achieved by supplying adjustment signals to the control device 17 via the line 18 in such a manner that a new adjustment is obtained before the mechanical movement of the beam 2 with respect to the sensor 3 leads to signal loss, is that a dynamic and continuous alignment of the beam 2 takes place with respect to the sensor elements 4 of the sensor 3 that are read out.

The supplying means 9 may include a majority decision device 22. In the case of output signals from more than one sensor element 4 being supplied to the line 14 with every readout of the sensor 3, it may be advantageous to relay a signal as indicated by the majority of the sensor elements 4 read. Possibly, a weighting of the various output signals may take place. Output signals from a sensor element 4 in a position near a center of a beam diameter 7 can be assigned a greater weight than an output signal from a sensor element 4 arranged near the edge or just beyond the edge of the beam diameter 7.

The alignment of the beam 2 with respect to the sensor 3 may also take place from time to time through transmission of a predetermined signal via the optical fiber 1 at predetermined points in time and detecting which sensor elements 4 respond in what way to the beam 2 resulting therefrom.

FIG. 4 shows a transceiver device 30. In a receiving mode, a beam 2 will exit from an optical fiber 1 and hit a sensor 31. In a transmission mode, a beam generator 32, which is known per se, will generate a beam 33, which is focused onto an entry surface 36 of the optical fiber 1 via suitable focusing means and semi-transparent elements 35, which are known per se.

Whereas only the alignment of the beam 2 with the sensor 31 was described in the foregoing, the present case also concerns the alignment of the beam 33 with the optical fiber 1. To that end, the device 30 comprises a semi-transparent element 35, a reflecting element 37, a two-dimensional, position-sensitive sensor 31, control means 38, and a beam-shifting element 39 for shifting the beam 33.

Initially, a beam 2 is directed at the sensor 31 from the optical fiber 1. This provides information as to the position of the sensor 31 at which the beam 2 hits the sensor 31, both in the plane of drawing and perpendicularly to the plane of drawing of FIG. 4. This information is available on, inter alia, a line 40 of the sensor 31 to control device 38. The control device 38 comprises a memory portion in which the information in question can be stored for further processing, as will be described in more detail further below. Subsequently, the beam generator 32 transmits a beam 33 in the direction of the semi-transparent element 35 via the focusing device 34. At said element 35, the beam 33 is split up into a beam 41 in the direction of the optical fiber 1 and a beam 42 which moves straight on in the direction of a mirror 37. In this embodiment, the mirror 37 is a flat mirror which reflects the beam 42 in the direction from where it came, as is indicated by means of the arrow point 43. Part of the radiation reflected by the mirror 37 will then be reflected as a beam 44 by the semi-transparent element 35 in the direction of the sensor 31. It is true also for the beam 44 that the coordinates of the position where the beam 44 hits the sensor will be relayed to the control device 38 via the line 40. The control device 38 thus knows both the position where the beam 2 hits the sensor 31 and the position where the beam 44 hits the sensor. From the differences in position between the beams 2 and 44 on the sensor 31 it can be simply calculated, by means of suitable software known to those skilled in the art, in what direction and to what extent the beam 33 is to be shifted by the beam-shifting element 39 in order to ensure that the beam 44 will hit the sensor 31 in exactly the same position as the beam 2. Owing to the fact that the beam 44 extends in the same direction as the beam 2, the beam 41 will also extend in the same direction as the beam 2. Consequently, the beam 41 will hit the surface 36 of the optical fiber 1 in the very position where the beam 2 exits, thus ensuring that the beam 44 will hit the sensor 31 in exactly the same position as the beam 2. Thus an excellent alignment of the beam generator 32 with the optical fiber 1 is obtained in a simple, non-mechanical manner.

Preferably, the beam-shifting element 39 is composed of two electrically drivable beam-shifting elements 39a and 39b which are capable of shifting the beam in two different directions, preferably extending perpendicularly to each other. Such devices are formed, for example, by anisotropic birefringent optical plates, which are known per se. Such optical plates shift an incident beam parallel to itself, to an extent which depends on the size of an electric field being applied. Also drivable beam-shifting elements other than the aforementioned ones may be used within the framework of the present invention. The only condition is that the position and/or the direction of an exiting beam differs from the position or the direction of an incident beam in dependence on a signal to be supplied, which signal may be an electric, mechanical, piezo-electric, thermal signal, or the like.

In order to enhance the mechanical precision of the device, a beam-splitting prism may be used as the semi-transparent element 35.

Furthermore, the reflecting element 37 may be disposed on a lateral surface of a beam-splitting prism 35 as indicated in FIG. 5 with a view to obtaining a greater precision.

In order to obtain a greater precision and to lower the optical requirements imposed on the focusing device 34, for example if the length of the beam 44 is different from the length of the beam 41, one surface of a beam-splitting prism 35 on which the reflecting element 37 is arranged may be curved. A concave reflecting element 37 is shown in FIG. 6 by way of example. Depending on the circumstances, it may also be desirable to provide a convex reflecting element 37.

In order to further enhance the precision and to lower the requirements imposed on the quality of the focusing device 34, one surface of a beam-splitting prism 35 on which the beam 33 is incident may be curved, all this as diagrammatically shown in FIG. 7.

In order to enhance the sturdiness of the device, the semi-transparent element 35, for example the beam-splitting prism 35, may be arranged on the sensor 3.

It is noted that the provision of a curvature in the reflecting element 37 and/or on the entry surface of the beam 33 on the semi-transparent device 35 can help prevent the formation of a parasitic resonance cavity for a wavelength which may be transmitted by the beam generator but which is undesirable.

Preferably, albeit not necessarily, the two-dimensional, position-sensitive sensor 31 is a sensor as described with reference to FIGS. 1 to 3.

Various embodiments and modifications will be obvious to a person skilled in the art who has perused the above. All such embodiments and modifications are considered to fall within the scope of the invention.

What is claimed is:

1. A device comprising a sensor, said sensor comprising two or more mutually separated sensor elements that deliver an output signal with a strength which is dependent on the intensity applied one of the two or more sensor elements, wherein:

a greatest dimension of a sensor element is at most equal to half the diameter of a diffraction-limited spot of a beam exiting an optic fiber at the location of the sensor elements, a diametrical dimension of the portion of the sensor provided with sensor elements is greater than the diameter of the beam exiting from the optical fiber, and a means for determining the strength of the output signal from each sensor element, and wherein the device further comprises a supply for supplying output signals delivered by the sensor elements to a processing device, and an adjustment means for adjusting the supply so as to supply or not supply output signals from the sensor elements to the processing device in dependence on the strength of the output signal from the sensor element, which adjustment means comprise said means for determining the strength of the output signal from each sensor element.

2. A device as claimed in claim 1, characterized in that said adjustment means (15) comprise a threshold circuit (16).

3. A device as claimed in claim 1, characterized in that said adjustment means (15) comprise timer means (20) for setting the supplying means (9) at predetermined points in time.

4. A device as claimed in claim 1, characterized in that said adjustment means (10) adjust the supplying means (9) so as to supply only the strongest output signal.

5. A device an claimed in claim 3, characterized in that the period between said predetermined points in time is smaller than half the cycle period of the highest frequency of a movement of the beam over the sensor.

6. A device as claimed in claim 1, characterized in that said supplying means (9) can be set to supply output signals from more than one sensor element (4*a*, . . . 4*b*), and that means (22) are present for determining the signal supplied to the processing means (8) on the basis of the majority of available output signals.

7. A device as claimed in claim 1, characterized in that said sensor (3) and said adjustment means (10) form part of a mingle integrated circuit (21).

8. A device as claimed in claim 7, characterized in that said supplying means (9) form part of said single integrated circuit (21).

9. A device as claimed in claim 6, characterized in that said determining means (15) form part of said single integrated circuit (21).

* * * * *